T. HYATT.
Illuminating Vault-Covers.

No. 145,191.  Patented Dec. 2, 1873.

WITNESSES:  INVENTOR.

UNITED STATES PATENT OFFICE.

THADDEUS HYATT, OF NEW YORK, N. Y., ASSIGNOR TO ELIZABETH A. L. HYATT, OF SAME PLACE.

IMPROVEMENT IN ILLUMINATING VAULT-COVERS.

Specification forming part of Letters Patent No. 145,191, dated December 2, 1873; application filed October 22, 1873.

CASE 10.

*To all whom it may concern:*

Be it known that I, THADDEUS HYATT, of New York, in the county of New York and in the State of New York, have invented certain new and useful Improvements in Illuminating-Gratings; and do hereby declare that the following is a full, clear, and exact description thereof, reference being had to the accompanying drawing making a part of this specification, in which—

Figure 1:
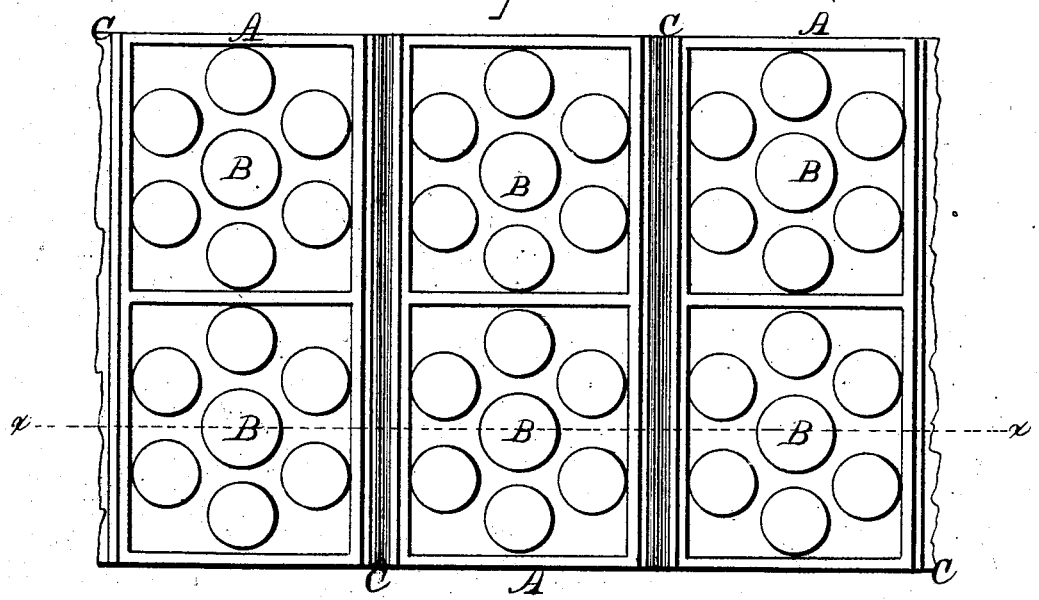
Figure 2:
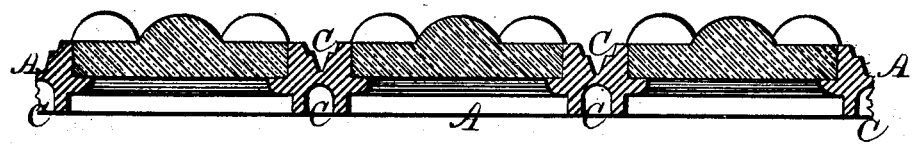

Figure 1 is a plan view of the upper side of a grating constructed upon my improved plan, and Fig. 2 is a section of the same upon line *x x* of Fig. 1.

Letters of like name and kind refer to like parts in each of the figures.

In the construction of illuminating or other gratings for areas, stoops, sidewalks, &c., a large item of expense is for alterations in size of the patterns in order to adapt castings made therefrom to the dimensions of the space to be covered, such alterations frequently equaling the cost of constructing the grating. To obviate this difficulty and enable the dimensions of the grating to be varied, as occasion requires, is the design of my invention, which consists in a metal grating, the frame of which is provided with grooves, along and within which said metal may be divided by breaking, substantially as and for the purpose hereinafter specified.

In the annexed drawings, A represents a metal frame provided with suitable light-openings, which contain corresponding glass lenses B, said openings and lenses having any desired shape, size, or relative arrangement. At suitable points, preferably equidistant from each other, a number of grooves, C, are cast in each side of the plate A, which grooves upon one side coincide with those upon the other side, as shown.

If desired, the grooves may be omitted from the upper side, and those upon the lower side made twice the ordinary depth, the object sought being to reduce the thickness of metal along certain lines, so as to permit said metal to be readily broken at such points without injury to other portions of the grating.

The breaking grooves may extend across the grating in opposite directions, so as to permit said grating to be reduced in size upon either side; but in practice I find it more advantageous to have patterns made for gratings containing one or more lenses in width, and provided with breaking grooves, which will enable the length of each to be varied at will.

As thus constructed, it will be seen that the expense of patterns and stock is largely reduced, while the labor required for fitting the gratings to place is not materially increased.

Having thus fully set forth the nature and merits of my invention, what I claim as new is—

A metal grating for areas, stoops, sidewalks, &c., the frame of which is provided with grooves, along and within which said metal may be divided by breaking, substantially as and for the purpose specified.

In testimony that I claim the foregoing I have hereunto set my hand this 26th day of July, 1873.

THADDEUS HYATT.

Witnesses:
 AMBROSE MONELL,
 CHARLES SPYR.